United States Patent Office 3,838,144
Patented Sept. 24, 1974

3,838,144
PURIFICATION OF AUSTRALIA ANTIGEN BY ULTRACENTRIFUGATION
John Michael Leach, Deal, England, assignor to Pfizer Inc., New York, N.Y.
No Drawing. Filed Aug. 21, 1972, Ser. No. 282,046
Claims priority, application Great Britain, Sept. 9, 1971, 42,017/71
Int. Cl. A61k 23/02, 27/00
U.S. Cl. 260—112 R                    5 Claims

ABSTRACT OF THE DISCLOSURE

Australia antigen (hepatitis-associated antigen) for use in the production of antisera in animals is purified from samples of human plasma containing the antigen by isopycnic banding in a zonal centrifuge followed by rate zonal centrifugation.

BACKGROUND OF THE INVENTION

The Australia antigen discovered by Blumberg, Bull. N.Y. Acad. Med. 40,377 (1964), is present in the blood of a very small proportion of the population, but its detection by rapid and reliable means is of the greatest importance in order to avoid the use for transfusion purposes of blood containing the antigen which can give rise to so-called serum hepatitis in the recipient. Such hepatitis, which may develop after a long incubation period, can be serious or even fatal in some cases.

Diagnostic compositions have been developed for the detection of Australia antigen in blood serum by latex agglutination as described in Nature, Feb. 19, 1972 and The Journal of Immunology, Vol. 108, No. 1, Jan. 19, 1972. These diagnostic compositions, in general, comprise an aqueous suspension of finely divided synthetic resin particles coated with antibody specific to Australia antigen. The antibody specific to Australia antigen is preferably derived from serum obtained from mammals, e.g. humans, sheep, goats or guinea pigs which contain the antibody or have been immunized with highly purified Australia antigen from human blood.

There is a need for a process for purifying Australia antigen obtained from humans whose blood contains the antigen to such a degree that no detectable serum proteins or other components remain which would interfere with its use as an immunizing agent in guinea pigs or other suitable mammals for the production of antibodies for subsequent use in a diagnostic composition for the detection of Australia antigen in human blood.

SUMMARY OF THE INVENTION

This invention is concerned with a method of preparing highly purified Australia antigen which comprises contacting blood serum containing Australia antigen and other antigenic material with the high density end of a liquid medium having a density gradient therein, which gradient includes the density of Australia antigen, subjecting the liquid medium to ultracentrifugation until equilibrium distribution of the serum components through the densty gradient is attained and then separating the fraction containing Australia antigen from the remainder of the medium.

DETAILED DESCRIPTION OF THE INVENTION

Antisera for use in diagnostic procedures for the detection of specific antigens such as Australia antigen in the blood of humans and other animals are required to be mono-specific, i.e. free from antibodies other than the antibody to the specific antigen which is to be detected. In order to produce such antisera it is necessary to inject an animal with a highly purified antigen, free from other antigens. Thus antigen-containing serum, from humans or other animals, must be subjected to a rigorous purification procedure to remove all antigenic material other than the specific antigen required.

For this purpose the technique of isopycnic banding may be used, in which a serum sample is contacted with a liquid medium having a density gradient therein which includes the density of the specific antigen required. The liquid medium is then subjected to ultracentrifugation to attain an equilibrium distribution of the serum components through the density gradient, according to their individual densities. Successive fractions of the medium and then displaced and those containing the desired antigen are separated. The application of this technique to the purification of Australia antigen is described in German Specification No. 2,049,515 and United States Specification No. 3,636,191.

In one form of this technique of isopycnic banding, the serum sample may be initially contacted with the low density end of the liquid medium, e.g. placed on top of the medium. However, in some cases, this leads to the phenomenon of droplet sedimentation whereby droplets containing serum proteins fall through the density gradient and lead to a spreading of serum proteins throughout the liquid medium even though individual antigens may be concentrated in narrow bands. Thus the desired antigen may be seriously contaminated with other antigenic materials.

We have now found that the Australia antigen can be obtained in a highly purified form by isopycnic banding whereby serum containing the antigen is contacted with the high density end of the liquid medium, a technique which has been applied to the separation of plasma lipoproteins (J. Lipid Research, 1970, vol. 11, pages 7–22).

According to the invention, a method of preparing the Australia antigen in highly purified form comprises contacting blood serum containing the Australia antigen and other antigenic material with the high density end of a liquid medium having a density gradient therein, which includes the density of the Australia antigen, subjecting the liquid medium to ultracentrifugation until an equilibrium distribution of the serum components through the density gradient is attained and then separating the fraction containing the Australia antigen from the medium.

The fraction containing the Australia antigen may then be further purified by dialysis through a semipermeable membrane to remove low moleuclar weight material, concentration to reduce its volume and then further ultracentrifugation in contact with a liquid medium having a density gradient therein, but this time using the rate zonal technique, i.e. at a rate and for a period such that equilibrium is not attained, the Australia antigen and other residual serum components being distributed through the medium according to their sedimentation coefficients in the medium.

The liquid media used in the process may be any aqueous solutions having density gradients therein in the appropriate ranges and suitable solutes for such solutions include sucrose, potassium bromide, cesium chloride and potassium tartrate. For isopycnic banding, a medium having a density gradient from 1.0 to at least 1.25 is desirable since the density of the Australia antigen is about 1.2. Aqueous sucrose solutions with densities of 1.2 and above are rather viscous, leading to slow attainment of equilibrium. It is therefore preferable to use other solutions such as aqueous cesium chloride or potassium bromide which can be prepared with densities up to 1.4 without becoming too viscous. Of these, potassium bromide is preferred since it is less corrosive than cesium chloride. For rate zonal banding, lower density ranges can be used and aqueous sucrose solutions are suitable.

The liquid media for both isopycnic and rate zonal banding are easily prepared with density gradients therein by well-known techniques, e.g. by loading the ultracentrifuge rotor, while it is spinning at about 2,000 r.p.m., with a solution whose concentration is increased at a controlled rate. The latter may be achieved by feeding a concentrated solution into a mixing vessel which initially contains a dilute solution and simultaneously feeding the well-mixed solutions into the rotor at twice the rate at which the concentrated solution is being fed into the mixing vessel. Thus the liquid being supplied to the rotor is of linearly increasing concentration (and therefore density) and under the conditions of centrifugation little or no physical mixing occurs in the rotor.

The serum sample to be contacted with the liquid medium having the density gradient therein must of course have a density at or just outside that of the medium at the end with which it is contacted. Thus, for the isopycnic banding technique of the present invention it must have a density at or just above that of the high density end of the gradient. For this purpose, the density of the sample may be increased by addition of the same solute as is used to prepare the liquid medium, e.g. cesium chloride or potassium bromide. For the rate zonal banding, however, the sample is contacted with the low density end of the gradient and so no addition of solute is necessary.

For the isopycnic banding technique of the present invention, an ultracentrifugation rate of 40,000 r.p.m. for a period of 16 hours has been found adequate to achieve equilibrium, using aqueous cesium chloride or potassium bromide solutions with density gradients therein from 1.0 to 1.4, or narrower ranges including the density of the Australia antigen, e.g. 1.1 to 1.3, but rates and periods are clearly interdependent as well as dependent on the composition of the medium. Similarly a rate of 40,000 r.p.m. for a period of 3½ to 4 hours has been found to give good separation of the Australia antigen from other serum components in the rate zonal technique, using an aqueous sucrose solution with a density gradient therein from 1.0 to 1.13 (corresponding to a concentration range of 0 to 30% sucrose) or narrower ranges, e.g. from 1.02 to 1.10 (corresponding to 5 to 25% sucrose).

The invention is illustrated by the following Examples.

EXAMPLE I

A titanium zonal ultracentrifuge rotor (type B XIV) was loaded with 400 ml. of an aqueous caesium chloride solution having a linear concentration gradient of 0 to 38% (g./100 ml.) therein, giving an approximately linear density gradient from 1.0 to 1.4. A 200 ml. sample of human serum, containing the Australia antigen and other human serum components to which caesium chloride had been added to a concentration of 50%, was then loaded to the edge of the zonal rotor, below the caesium chloride solution, and finally a 50 ml. underlay of 54% aqueous caesium chloride solution was loaded to the edge of the zonal rotor, below the serum sample, to ensure complete loading of the sample. The centrifuge was then run at 40,000 r.p.m. for 16 hours at 20° C.

At the end of the run, the contents of the rotor were displaced through the center of the rotor by 54% aqueous caesium chloride solution fed to the edge of the rotor. Successive 8 ml. fractions were collected and their refractive index and ultra-violet absorption were measured automatically and recorded on a chart. The refractive index was used to calculate the caesium chloride concentration and density of each fraction, and the degree of ultra-violet absorption were taken as a measure of the protein content of each fraction. The presence of Australia antigen was detected by gel diffusion tests on each fraction, and its concentration in those fractions in which it was found to be present was determined by complement fixation tests on small pools of several adjacent fractions.

The Australia antigen was found to be concentrated in a 50 ml. zone with a mean density of 1.22, coincident with a visible peak in the U.V. (ultra-violet) absorption curve. The bulk of the human serum proteins was found to be contained in a 200 ml. zone with a mean density of 1.37. The zone containing the Australia antigen contained only about 5% of the original serum proteins, thus providing a 20-fold purification as well as a 4-fold concentration of the Australia antigen in the original sample.

EXAMPLE II

The procedure of Example I was repeated using an aqueous potassium bromide solution having a linear concentration gradient of 10% to 34%, giving an approximately linear density gradient from 1.076 to 1.31. A 145 ml. serum sample containing 34% potassium bromide was used in this case, and a 50 ml. underlay of 40% potassium bromide was loaded below the serum sample.

After running the centrifuge at 40,000 r.p.m. for 16 hours at 25° C. (to avoid crystallization of the potassium bromide), the contents of the rotor were displaced with 40% aqueous potassium bromide solution and analyzed in the manner described in Example I. The Australian antigen was found to be concentrated in a 50 ml. zone with a mean density of 1.21, again containing only 5% of the original serum proteins.

EXAMPLE III

The procedure of Example II was repeated, except that the centrifuge was run for 18 hours instead of 16 hours. The density of successive fractions showed an approximately linear gradient from 1.13 at fraction 3 to 1.275 at fraction 53, representing the original 400 ml. potassium bromide gradient. Subsequent fractions beyond 53 showed evidence of mixing with the serum sample and underlay. A part of the protein content as measured by ultraviolet absorption remained in the sample zone, with a secondary peak at fractions 18 to 23 (density 1.1 to 1.19) and a shoulder on this peak at fractions 27 to 30 (density 1.20 to 1.21). Australia antigen was detected in fractions 12 to 50 and the major part was concentrated in fractions 24 to 38 (density 1.19 to 1.23) with a peak concentration associated with the shoulder at fractions 27 to 30 (mean density 1.205).

The products of several runs according to each of the Examples, i.e. the pooled fractions from the 50 ml. zones of concentrated Australia antigen from Examples I or II, or the 120 ml. pooled fractions 24 to 38 from Example III, were combined and dialyzed against phosphate-buffered saline, until substantially free of inorganic salts. The solution was then further dialyzed against a 50% aqueous solution of polyethylene glycol ("Carbowax" 20M, Union Carbide Co.) to abstract water and small ions, thereby concentrating the solution to about one-sixth of the original volume of the pooled fractions.

The concentrated solution containing the Australia antigen was then subjected to further purification by rate zonal centrifugation in sucrose solution having a density gradient therein, of which the following is a typical example: 400 ml. of an aqueous sucrose solution having a density gradient from 1.02 to 1.13 (5 to 30% sucrose) were fed into a B XIV zonal rotor in the manner described in Example I, the highest density being at the edge of the rotor. An aqueous 45% sucrose solution (density 1.20) was fed into the edge of the rotor to displace the density gradient towards the center of the rotor, until the light end of the density gradient appeared as outflow from the center of the rotor, and then 22 ml. of concentrated solution containing Australia antigen, derived from the combined fractions 24 to 38 of Example III, were fed into the center of the rotor, followed by 100 ml. of phosphate-buffered aqueous saline solution as overlay. The centrifuge was then run at 40,000 r.p.m. for 3½ hours at 20° C., by which time it was calculated that the Australia antigen would have moved to a zone at about midway along the density gradient. The contents of the rotor were then displaced from the center of the rotor by feeding 45% sucrose solution to the edge of the rotor and 8 ml. fractions were collected and analyzed as described in Example I.

The results of rate zonal centrifuging in the sucrose gradient showed that the Australia antigen was concentrated in fractions 34 to 51, corresponding to a zone of density 1.06 to 1.10, whereas the bulk of the remaining protein content remained in a zone near the lower end of the density gradient (peak at about fractions 17–18). The density showed a substantially linear gradient from 1.03 at fraction 20 to 1.10 at fraction 52, with some mixing with the overlay at the lower end and with the 45% sucrose solution at the upper end of the gradient.

A sample of the combined fractions 34 to 51 was reconcentrated by dialysis against phosphate-buffered saline solution to remove sucrose and then against 50% aqueous "Carbowax" 20M, as before. When this material was tested by gel diffusion against rabbit anti-human serum, contamination with human serum protein was undetectable at a level corresponding to $1/10,000$ dilution of whole serum.

What is claimed is:

1. A method of preparing highly purified Australia antigen which comprises contacting blood serum containing Australia antigen and other antigenic material with the high density end of a liquid medium having a density gradient therein, which gradient includes the density of Australia antigen, subjecting the liquid medium to ultracentrifugation until equilibrium distribution of the serum components through the density gradient is attained and then separating the fraction containing Australia antigen from the remainder of the medium.

2. A method as claimed in Claim 1, in which the medium is an aqueous solution having a density gradient therein within the range from 1.0 to 1.4.

3. A method as claimed in Claim 2, in which the medium is aqueous caesium chloride or potassium bromide solution.

4. A method as claimed in Claim 1, in which the separated fraction containing Australia antigen is subjected to dialysis and then to further ultracentrifugation in contact with a liquid medium having a density gradient therein at a rate and for a period such that equilibrium is not achieved but that the Australia antigen and other residual serum components are distributed through the medium, and separating the fraction containing Australia antigen from the remainder of the medium.

5. A method as claimed in Claim 4, in which the liquid medium in which the further ultracentrifugation is carried out is aqueous sucrose solution.

References Cited

UNITED STATES PATENTS 3,636,191   1/1972   Blumberg et al. _____ 424—89

OTHER REFERENCES

Chem. Abstracts, Vol. 72, 1970, 75576N, Wilcox et al.
Chem. Abstracts, Vol. 75, 1971, 3182V, Gerin et al.
Chem. Abstracts, Vol. 75, 1971, 96803M, Sakurada.
Chem. Abstracts, Vol. 75, 1971, 96748X, Schober et al.

HOWARD E. SCHAIN, Primary Examiner

U.S. Cl. X.R.

424—12, 88